United States Patent [19]
Brown

[11] Patent Number: 5,959,441
[45] Date of Patent: Sep. 28, 1999

[54] VOLTAGE MODE CONTROL FOR A MULTIPHASE DC POWER REGULATOR

[75] Inventor: Alan E. Brown, Georgetown, Tex.

[73] Assignee: Dell USA, L.P., Round Rock, Tex.

[21] Appl. No.: 08/832,254

[22] Filed: Apr. 3, 1997

[51] Int. Cl.⁶ .................................. G05F 1/40; H02J 1/00
[52] U.S. Cl. .............................. 323/282; 323/284; 307/82
[58] Field of Search .................................... 323/282, 283, 323/284; 307/82

[56] References Cited

U.S. PATENT DOCUMENTS

| | | | |
|---|---|---|---|
| 3,978,393 | 8/1976 | Wisner et al. | 323/283 |
| 4,408,268 | 10/1983 | Peters et al. | 363/124 |
| 4,585,986 | 4/1986 | Dyer | 323/282 |
| 4,857,822 | 8/1989 | Tabisz et al. | 323/282 |
| 5,414,352 | 5/1995 | Tanase | 324/158 |
| 5,661,646 | 8/1997 | Huang et al. | 363/124 |

OTHER PUBLICATIONS

Abraham I. Pressman; Switching Power Supply Design; 1991; pp. 1 through 33.

*Primary Examiner*—Peter S. Wong
*Assistant Examiner*—Bao Q. Vu
*Attorney, Agent, or Firm*—Skjerven, Morrill, MacPherson, Franklin & Friel, LLP; David G. Dolezal

[57] ABSTRACT

A multiphase direct current (DC) regulator using voltage mode control to provide a regulated voltage and provide current equalization between the phases. The regulator includes a voltage mode control circuit receiving an indication voltage level indicative of the amount of current supplied from the DC power source to an inductor of a first phase. The voltage mode control circuit providing a first control signal dependent upon the indication voltage level to a switching circuit that provides a switching signal to a switch. The switch controlling the amount of current from the DC power source supplied to a second inductor of a second phase according to the switching signal.

63 Claims, 5 Drawing Sheets

| FIG. 2A | FIG. 2B |

VOLTAGE MODE CONTROL FOR A MULTIPHASE DC POWER REGULATOR

BACKGROUND OF THE INVENTION

1. Field of the Invention

The present invention relates to voltage regulators and more specifically to multiphase direct current voltage regulators using voltage mode control.

2. Description of the Related Art

Computer systems in general and International Business Machines (IBM) compatible personal computer systems in particular have attained widespread use for providing computer power to many segments of today's modern society. A personal computer system can usually be defined as a desk top, floor standing, or portable microcomputer that includes a system unit having a system processor and associated volatile and non-volatile memory, a display monitor, a keyboard, one or more diskette drives, a fixed disk storage device, and an optional printer. One of the distinguishing characteristics of these systems is the use of a system board to electrically connect these components together. These personal computer systems are information handling systems which are designed primarily to give independent computing power to a single user (or a relatively small group of users in the case of personal computers which serve as computer server systems) and are inexpensively priced for purchase by individuals or small businesses. A personal computer system may also include one or a plurality of I/O devices (i.e. peripheral devices) which are coupled to the system processor and which perform specialized functions. Examples of I/O devices include modems, sound and video devices, or specialized communication devices. Mass storage devices such as disk drive systems which include hard disks drives, CD-ROM drives or magneto-optical drives are also considered to be peripheral devices. Other types of computer systems include network servers which provide shared storage to a network of computer users.

One problem with computer systems as well as other electrical devices is how to provide power to the various components of the computer system within the voltage tolerance ranges required by those components. Power is usually supplied to a computer system from an alternating current (AC) source and converted to a direct current (DC) power by an AC to DC converter. DC power can also be supplied from a battery source as well. The DC output of a converter or battery source is then regulated by a DC regulator to provide DC power within specified tolerances.

One type of DC voltage regulator is a pulse width modulated "buck" regulator. Buck regulators typically include a switch in the form of a transistor in series with an unregulated DC power source. Connected to the other side of the switch is an inductor-capacitor (LC) circuit and diode. An oscillating circuit switches on and off the transistor to periodically provide current to the LC circuit from the unregulated DC power source. The LC circuit smoothes out the modulated current from the DC power source to provide an essentially ripple-free DC voltage. The longer that the switching transistor is switched on, the higher the DC voltage is at the output of the LC circuit. The regulator usually includes a feedback circuit to control the amount of time that the switching transistor is turned on and correspondingly, the amount of current provided to the transistor from the DC power source.

One problem with this type of DC regulator is that it consumes power in regulating the voltage and, consequently, generates heat which can significantly shorten the working life of the components in the computer system. A dual phase regulator is a more efficient regulator that includes two inductors in parallel with each inductor, on average, carrying half of the current provided to the LC circuit. Consequently, the power consumed, and therefore the heat produced, is significantly reduced. Another advantage of a multiphase regulator is that the heat generated by the switching can be spread out as opposed to being concentrated in a signal area as with a single phase system.

One problem with a dual phase regulator is that the "on-time" of one inductor needs to be nearly equal to the on-time of the other inductor, else one of the inductors will disproportionately carry a majority of the current load, and thus eliminating the benefits of a dual phase system. To remedy this problem, current mode control feedback is used to try to equalize the currents. However, a current mode control feedback consumes power and therefore produces heat. In addition, current mode control feedback requires current sensor resistors which can add to the cost of the circuit.

What is needed is an improved from of feedback for a multiphase DC regulator.

SUMMARY OF THE INVENTION

It has been discovered that providing voltage mode control for a multiphase DC regulator reduces the power consumed by the regulator in providing a regulated voltage and in equalizing the average current load of each phase inductor.

More specifically, in one aspect of the invention, a multiphase direct current (DC) regulator for regulating power from a DC power source, includes a first inductor coupled to a regulator output. The regulator also includes a first switch coupled to the first inductor. The first switch is coupled to receive current from the DC controls power source and to supply the current to the first inductor. The regulator includes a second inductor coupled to the regulator output and a second switch coupled to the second inductor. The second switch is coupled to receive current from the DC power source and to supply the current to the second inductor. The second switch controls the amount of current supplied from the DC power source to the second inductor. The regulator further includes a voltage mode control circuit receiving an indication voltage level indicative of the amount of current supplied from the DC power source to the second inductor. The voltage mode control circuit provides a first control signal dependent upon the indication voltage level. The regulator also includes a first switching circuit responsive to the first control signal. The first switching circuit provides a first switching signal to the first switch. The first switch controls the amount of current from the DC power source supplied to the first inductor according to the first switching signal.

In another aspect of the invention, a computer system includes processor and a direct current (DC) power source. The direct current power source provides current at a voltage level. The computer system also includes a multiphase regulator circuit similar to the multiphase DC regulator described above and further includes a regulator output for providing DC power to the processor.

In another aspect of the invention, a method for operating a multiphase direct current regulator includes providing current from a power source to a first inductor via a first switch and providing a first switching signal to control the amount of current provided to the first inductor via the first switch. The method also includes providing current from the power source to a second inductor via a second switch and adjusting the first switching signal according to a first voltage level indicative of the amount of current provided to the second inductor.

In another aspect of the invention, a multiphase direct current (DC) regulator for regulating power from a DC power source, includes a first inductor coupled to a regulator output a first switch is coupled to the first inductor. The first switch coupled to receive current from the DC power source and to supply the current to the first inductor. The regulator also includes a second inductor coupled to the regulator output and a second switch coupled to the second inductor. The second switch coupled to receive current from the DC power source and to supply the current to the second inductor. The second switch controlling the amount of current supplied from the DC power source to the second inductor. The regulator further includes a comparator receiving at a first input a first voltage level proportional to the voltage level at the regulator output. The comparator receiving at a second input a second voltage level proportional to a reference voltage level. The comparator having an output for providing a control signal. The regulator includes a first switching circuit responsive to the first control signal, the first switching circuit providing a first switching signal to the first switch, the first switch controlling the amount of current from the DC power source supplied to the first inductor according to the first switching signal.

Having a voltage mode control circuit receive an indication voltage level indicative of the amount of current supplied from a DC power source to the second inductor advantageously provides a multiphase DC regulator that consumes less energy and produces less heat in the current equalization of the phases.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The following sets forth a detailed description of the best contemplated mode for carrying out the invention. The description is intended to be illustrative of the invention and should not be taken to be limiting.

Figure 1:
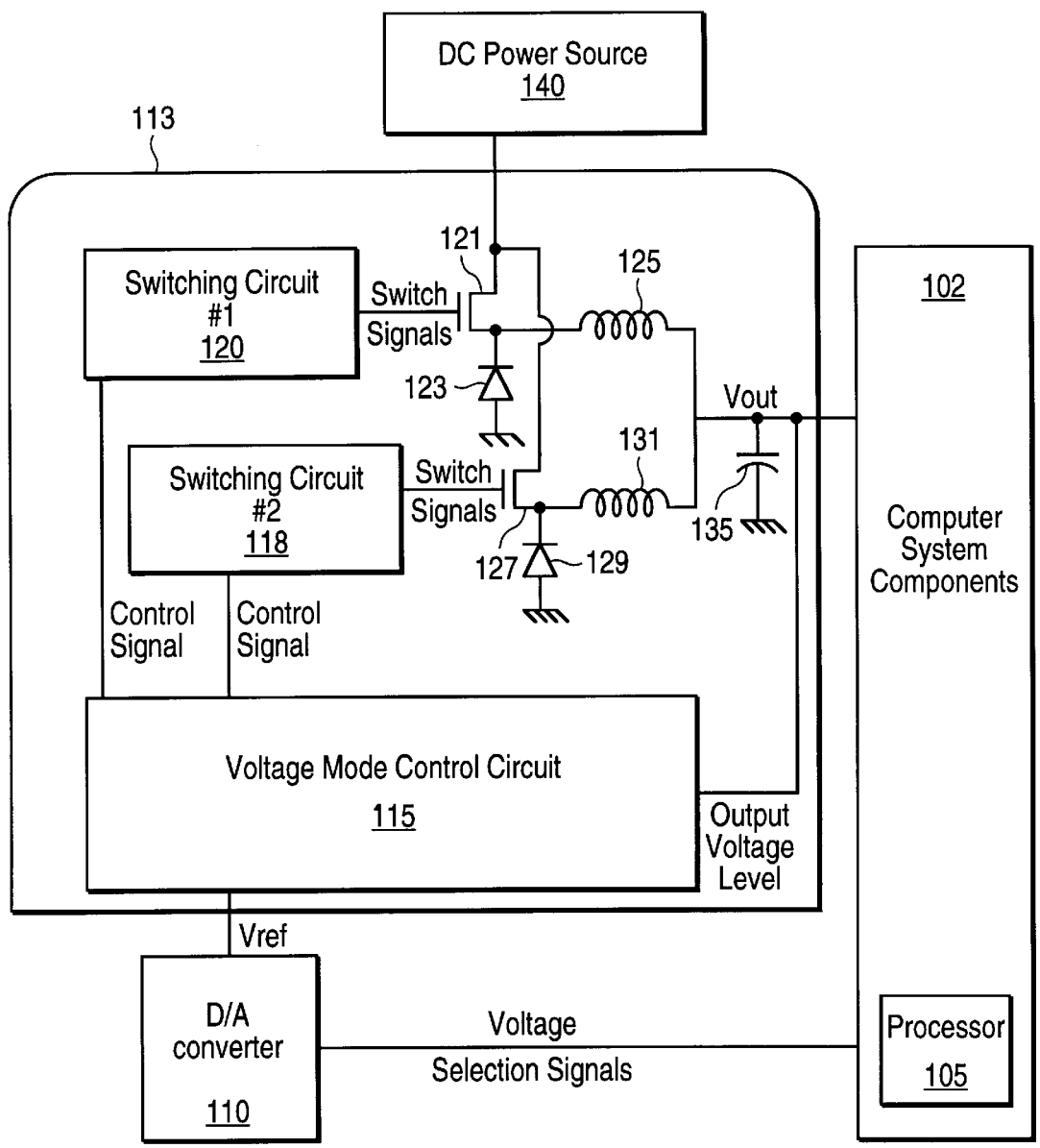
FIG. 1 is a block diagram of a computer system implementing the present invention.

FIG. 1 shows a block diagram of a computer system employing the present invention. A computer system components block 102 includes a processor 105, associated memory (not shown), and peripheral devices (not shown). The computer system requires regulated DC power at various voltage levels to power the components within the computer system 102 including the processor 105. Because the operations of these components are sensitive to the voltage level of the power supplied, the power supplied must be within certain tolerances at all times during the operation of the computer. Also, the power supplied should be relatively free of noise and ripple voltages.

The computer system 102 and more specifically the processor 105 selects the voltage level to be supplied to the computer system. The processor provides a digital voltage selection signal to the Digital to Analog (D/A) converter 110. The D/A converter converts the digital voltage selection signal from the processor to the desired voltage level as indicated by voltage selection signal.

The DC power source 140 supplies direct current to the voltage regulator 113 at a predetermined voltage. The DC power source 140 can be either an AC to DC converter, a battery, or a combination of a converter and battery. In another embodiment, the DC power supply can include redundant AC to DC power supplies.

In the embodiment shown, the multiphase regulating circuit 113 is a dual phase, non-synchronous, buck regulator that includes a voltage mode control circuit 115, switching circuits 120 and 118, switches 121 and 127, inductors 125 and 131, flyback diodes 123 and 129, and a smoothing capacitor 135. The multiphase regulating circuit 113 receives current from the DC power source 140 and provides regulated power at a regulated voltage level at Vout to the rest of the computer system components 102 including the processor 105. The regulated voltage level is approximately the voltage level of the Vref signal provided by the D/A converter 110. The regulated voltage level is usually within tolerances and is relatively free from voltage dips caused by mild fluctuations in the DC power source 140 or by load changes from the computer system components 102.

The regulator shown in FIG. 1 includes two phases where each phase includes a switch, a flyback diode, and an inductor. In the embodiment shown, the switches 121 and 127 are MOSFETs. The switches 121 and 127 control the amount of current supplied to the inductors 125 and 131 respectively, according to the switching signals provided by the switching circuits 120 and 118 respectively. The switching signal oscillates between a first voltage level where the switch is conducting and the DC power source is providing current to the inductor, and a second voltage level, where the switch is open and no current from the DC power source is supplied to the inductor through the switch. The switching signal has a duty cycle which is the ratio of the period time that switching signal remains at the first voltage level divided by the combined period of time that the switching signal remains at the first voltage level and remains at the second voltage level.

When the switch is conducting, the DC power source 140 is supplying current to the inductor. The inductor, along with the smoothing capacitor store energy from the DC power source. When the switch opens, the DC power source 140 ceases supplying current to the inductor. Inductor and smoothing capacitor 135 act as a filter to provide an essentially clean and ripple-free DC voltage to the computer system components 102. The greater the ratio of time where the switch is conducting versus the time where the switch is not conducting, the higher the voltage level supplied to the computer system components. Thus, the voltage level at the output is increased by increasing the duty cycle of the switching signal which increases the amount of time that the switch is conducting.

Because the regulator shown in FIG. 1 is a dual phase regulator, the current load provided by the DC power source can be shared between each inductor of each phase. If the average current flowing through each inductor is equal, the amount of power consumed by the regulator from current losses can be reduced due to the smaller amount of current flowing through each inductor. However, if the average current flowing through each inductor is not equal, then the power and heat reduction benefits can not be achieved.

The voltage mode control circuit 115 receives or senses the voltage level of the output (Vout) and receives the Vref signal from the D/A converter 110. The voltage mode control circuit 115 also receives indication signals (see FIG. 2) that are indicative of the amount of current flowing through each inductor from the DC power source. As a result of comparing these signals, the voltage mode control circuit provides control signals to the switching circuits 120 and 118. In response, the switching circuits 120 and 118 adjust the switching signals to increase or decrease the duty cycles and therefore adjust the voltage level of the output (Vout).

Figure 2A:
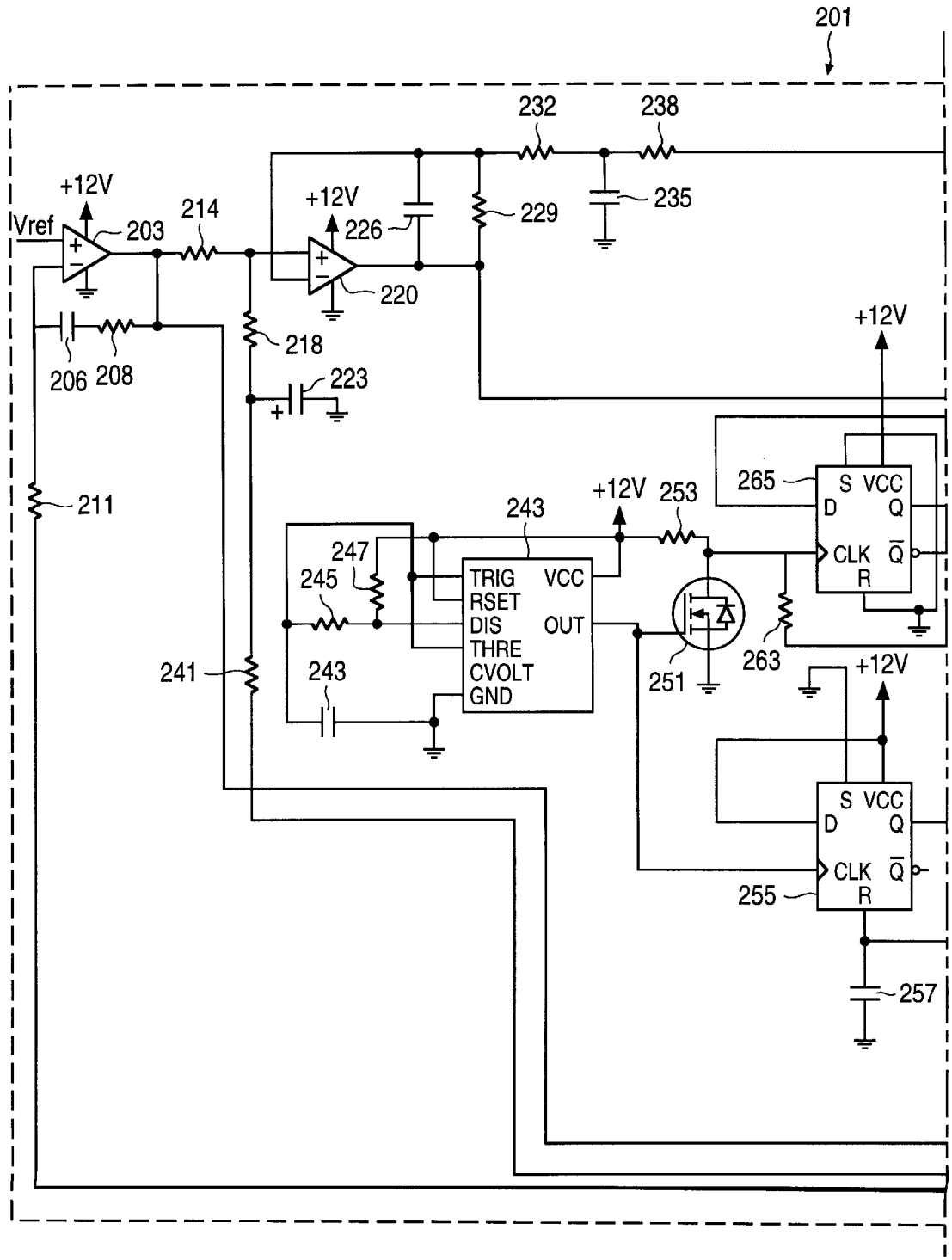
FIG. 2 is a circuit diagram of one embodiment of a multiphase regulator circuit with voltage mode control.
Figures 2, 2B:
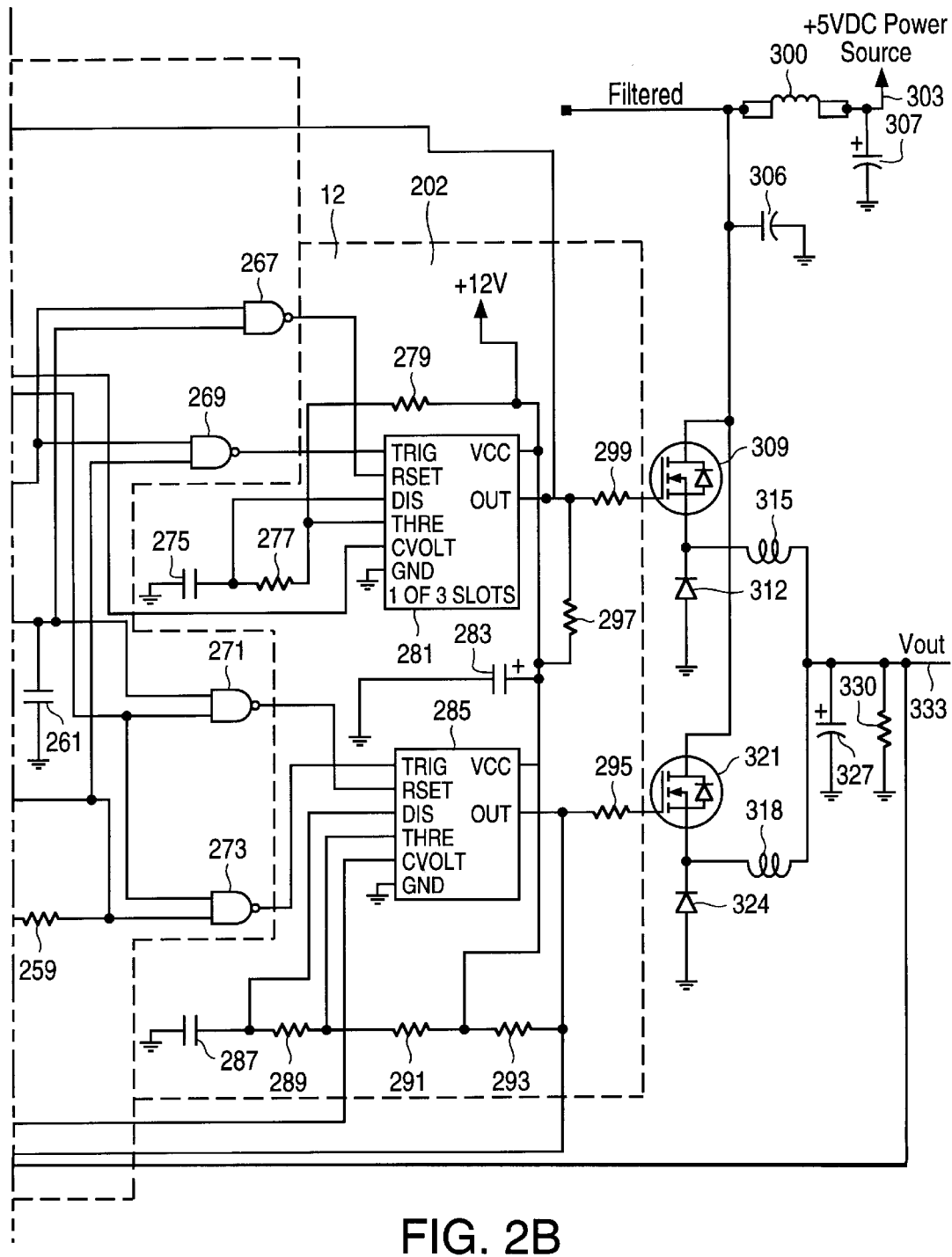

FIG. 2 shows one embodiment of a circuit diagram for a multiphase regulating circuit 113. The voltage mode control circuit is shown in phantom block 201 and the switching circuits are shown in phantom block 202. The embodiment shown is a dual phase, non-synchronous, buck regulator with voltage mode control. Amplifier 203 receives at its non inverting input, a voltage reference signal (Vref) from the D/A converter 110. The positive rail of amplifier 203 is tied to a +12 volts DC (VDC) power source and the negative rail tied to the ground. The output of amplifier 203 is connected to resistors 214 and 208. The output of amplifier 203 is also connected to the Cvolt input of timer 285. The inverting input of amplifier 203 is connected to one end of resistor 211 and to one end of capacitor 206. The other end of capacitor 206 is connected to resistor 208. Capacitor 206 and resistor 208 are used to control the phase margin and the gain margin of the regulator circuit during operation.

Resistor 214 is connected to the non inverting input of differential amplifier 220 and to resistor 218. The positive rail of amplifier 220 is connected to a +12 VDC power source and the negative rail is connected to ground. Resistor 218 is also connected to capacitor 223 and to resistor 241. The other end of resistor 241 is connected to the output of timer 285. Capacitor 223 and resistor 241 form an integrator that integrates the output of timer 285. Capacitor 226 and resistor 229 are each connected at one end to the inverting input of amplifier 220 and connected at the other end to the output of amplifier 220. Capacitor 226 controls the cutoff bandwidth of differential amplifier 220. The capacitor is sized to make the response of amplifier 220 slightly slower than the response of amplifier 203 in order to keep the regulator circuit from oscillating. The inverting input of amplifier 220 is also connected to resistor 232. Resistor 232 is connected to a capacitor 235 and resistor 238. The other end of capacitor 235 is tied to the ground. Capacitor 235 and resistor 238 to form an integrator to integrate the output of timer 281. The values of resistors 214 and 218 are approximately equal to the values of resistors 229 and 232 respectively. The output of amplifier 220 is also tied to the Cvolt input of timer 281 to provide a control signal to timer 281.

Timer 249 produces an oscillating signal at its output. In the embodiment shown, timers 249, 285, and 281 are National Semiconductor 555 timers. The Vcc input of each timer is connected to a +12 VDC power source and the Ground input (GND) of each timer is connected to ground. The reset of timer 249 is also connected to a +12 VDC power source. Resistor 247 is connected between the discharge input of timer 249 and a +12 VDC source. Resistor 247 is also connected to resistor 245. The other end of resistor 245 is connected to the trigger input of timer 249, the threshold input of timer 249, and capacitor 243. The other end of capacitor 243 is connected to ground. The resistive values of resistors 245 and 247 and the capacitance value of capacitor 243 set the frequency and duty cycle of the output of timer 249.

The output of timer 249 is connected to the gate input of invertor 251. In the embodiment shown, invertor 251 is a MOSFET. The source input of invertor 251 is connected to a +12 VDC power source via resistor 253. The drain is connected to ground. The output of timer 249 is also connected to the clock input of the flip flop 255. The D and Vcc inputs of flip flop 255 are connected to a +12 VDC power source and the set input of flip flop 255 is tied to ground. The output of flip flop 255 is tied to nand gates 273 and 269. The output of flip-flop 255 is also tied to resistor 259. The other end of resistor 259 is tied to the reset of the flip-flop 255 and to capacitor 257 with the other end of capacitor 257 being tied to ground. The values of capacitor 257 and resistor 259 determine the amount of time that the output of flip-flop 255 remains high after each rising pulse of the output of timer 249.

The drain of transistor 251 is also connected to the clock input of D flip flop 265. The Vcc input of flip flop 265 is tied to a +12 VDC power source. The set and reset inputs of flip-flop 265 are connected to ground. The D input is connected to the inverted Q output of flip flop 265. The inverted Q output is also connected to nand gates 273 and 271. The Q output of flip flop 265 is connected to nand gates 269 and 267.

The drain of transistor 251 is also connected to resistor 263 which on the other end is connected to capacitor 261. The other end of capacitor 261 is connected to ground. Resistor 263 and capacitor 261 form a delay circuit to provide a delayed signal of the inverted output of timer 249. This delayed signal is provided to the inputs of nand gates 271 and 267. This delay prevents the voltage level at the reset inputs of timers 281 and 285 from momentarily going low during every other falling edge of the output of timer 249.

Timers 281 and 285 provide the switching signals to the switching transistors 309 and 321 respectively. The output of nand gate 269 is connected to the trigger input of timer 281. The output of nand gate 267 is connected to the reset input of timer 281. The threshold input of timer 281 is connected to one end of resistor 279 with the other end of resistor 279 connected to a +12 VDC power source. The threshold input is also connected to resistor 277. The other end of resistor 277 is connected to the discharge input of timer 281 and to capacitor 275 with the other end of capacitor 275 being connected to ground. Resistors 279 and 277 form a voltage divider to give the threshold input a DC bias. The output of the timer 281 provides a switching signal to switching transistor 309 via resistor 299. The output of timer 281 is also connected to pull up resistor 297 with the other end of pull up resistor 297 tied to a +12 VDC power source.

The output of nand gate 273 is connected to the trigger input of timer 285. The output of nand gate 271 is connected to the reset input of timer 285. The threshold input of timer 285 is connected to one end of resistor 291. The other end of resistor 291 is connected to a +12 VDC source. The threshold input is also connected to resistor 289. The other end of resistor 289 is connected to the discharge input of timer 285 and to capacitor 287 with the other end of capacitor 287 being connected to ground. Resistors 291 and 289 form a voltage divider to give the threshold input a DC bias. The output of the timer 285 provides a switching signal to switching transistor 321 via resistor 295. The output of timer 285 is also connected to pull up resistor 293 with the other end of pull up resistor 293 tied to a +12 VDC power source.

In the embodiment shown, the multiphase regulator circuit 113 has two phases where each phase is coupled to and receives current from a +5 VDC output of the DC power source 140 connected to input 303. The phases are coupled to the +5 VDC output via a filter that includes inductor 300 and capacitors 307 and 306.

In one phase, the drain input of switching transistor 309 is coupled to the +5 VDC output. The source of switching transistor 309 is connected to inductor 315. The other end of inductor 315 is connected to the output 333 of the multiphase regulator circuit (Vout) and to smoothing capacitor 327. The gate input of switching transistor 309 receives a switching signal from the output of timer 281 via resistor 299. A bleeder resistor 330 is also connected to the output 333 to provide a load when the computer system components 102 are in a low power consumption state.

In the second phase of the multiphase regulating circuit 113, the drain of the switching transistor 321 is coupled to the +5 VDC output of power source 140. Connected to the source of the switching transistor 321 is inductor 318. The other end of inductor 318 is connected to the output 333 of the multiphase regulating circuit and to inductor 315.

In the embodiment shown, the multiphase regulating circuit 113 is a nonsynchronous regulating circuit in that flyback diodes 312 and 324 are connected to the source of switching transistors 309 and 321, respectively. The other ends of the flyback diodes are tied to ground. These diodes prevent the sources of transistors 309 and 321 from being pulled to an excessive negative voltage when the transistors are open. In other embodiments, the multiphase regulator may be a synchronous regulating circuit where the diodes 312 and 324 are replaced by transistors whose gates are connected to appropriate drive circuitry.

Figure 3A:
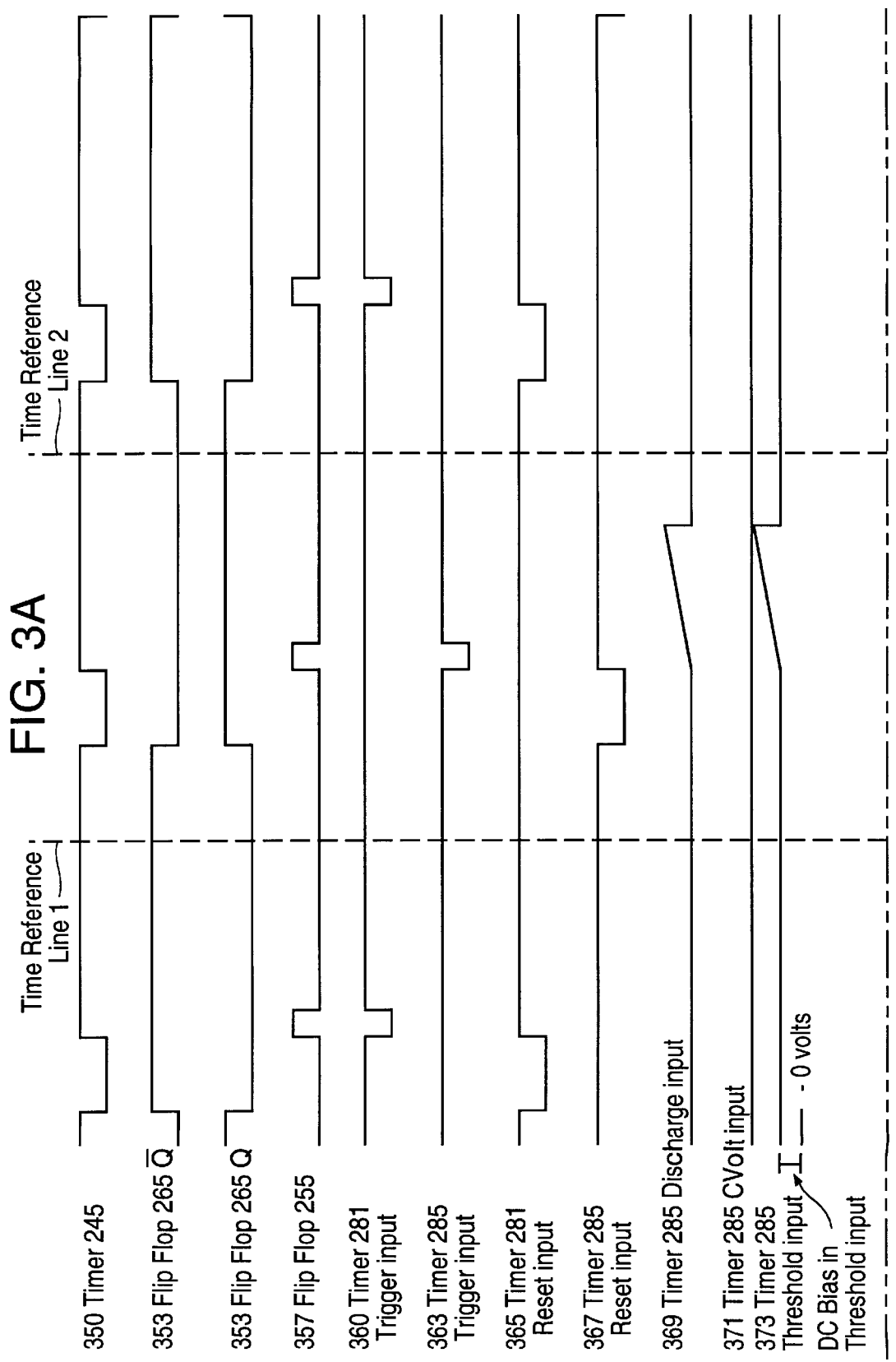
FIG. 3 is a timing diagram showing signals produced by the circuit in FIG. 2.
Figure 3B:
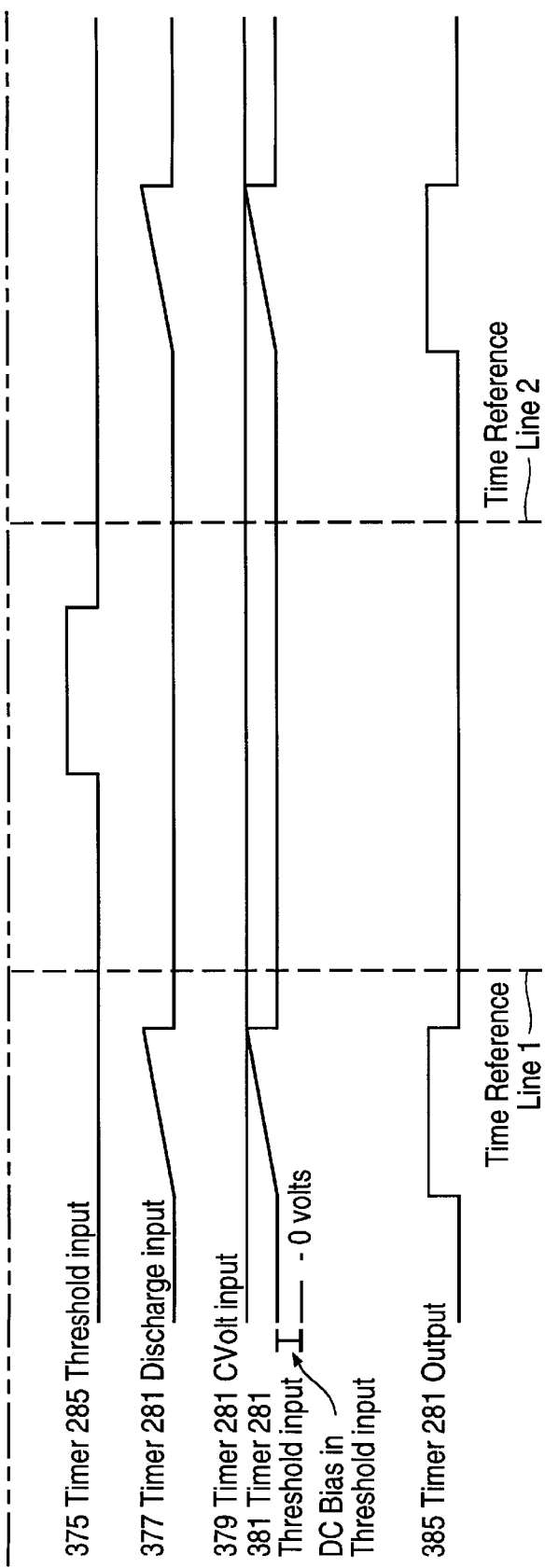
Figure 3:
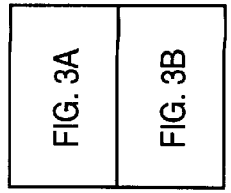

FIG. 3 is a timing diagram showing the various voltage levels and signals for the components in FIG. 2. In the embodiment shown in FIG. 2, the output of timer 249 (350) oscillates between approximately 12 volts DC and 0 volts. The Q output (355) of flip-flop 265 and the inverted Q output (535) of flip flop 265, as well as the output of flip- flop 255 (357) all transition back and forth between 0 volts and approximately 12 volts DC. The output of nand gate 269 provides the trigger input (360) for timer 281. The output of nand gate 273 provides the trigger input (363) for timer 285. The output of nand gate 267 provides the reset input (365) for timer 281. The output of nand gate 271 provides the reset input (367) for timer 285. All four nand gate outputs 360, 363, 365 and 367 transition back and forth between 0 volts and approximately 12 volts DC.

In the embodiment shown, the threshold input 373 of timer 285 and the threshold input 381 of timer 281 both have a DC bias of approximately 1 volt provided by resistors 289 and 277, respectively. This threshold bias is provided to insure the proper operation of the 555 timer. The voltage level of the discharge inputs 369 and 377 are lower by the DC bias level than the voltage level of the threshold inputs 373 and 381.

The threshold input 373 of timer 285 remains at the DC bias level until the reset input 367 of timer 285 is at approximately 12 VDC and the trigger input 363 of timer 285 is at 0 volts. At this time, the voltage level of the threshold input 373 begins to rise at a rate determined by resistors 291 and 289 and capacitor 287. Also at this time, the timer 285 output (375) transitions from 0 volts to approximately 12 volts DC causing switching transistor 321 to conduct. The timer 285 output 375 remains at this voltage level until the threshold voltage input 373 of timer 285 rises to the same voltage level as the as the Cvolt input 371 of timer 285. At this point, the timer 285 output 375 transitions from approximately 12 volts to 0 volts level thus causing the switching transistor 321 to be non conducting. If the threshold input 373 of timer 285 never reaches the voltage level of the Cvolt input 371, then the output 375 of timer 285 will transition from approximately 12 volts to 0 volts when the reset input 367 goes back to 0 volts. Raising the voltage level of the Cvolt input 371 increases the amount of time that the timer 285 output 375 remains at approximately +12 volts and thus, increases the duty cycle of the timer 285 output.

The output (385) of timer 281 is produced in a similar manner to the output 375 timer 285.

Referring to FIGS. 2 and 3, the operation of the multiphase regulator circuit 113 as shown in FIG. 2 is described as follows. The output voltage provided to the computer system components 102 at regulator output 333 is provided to the inverting input of amplifier 203 via resistor 211. Voltage reference signal (Vref) indicative of the desired voltage level of the processor is provided at the non inverting input of amplifier 203. If the regulator output voltage at output 333 is less than the reference voltage, the voltage level of the output of amplifier 203 rises. If the regulator output voltage is greater than the reference voltage, the voltage level of the output of amplifier 203 decreases. Since the output of amplifier 203 is connected to the Cvolt input 371 of timer 285, an increase or decrease in the output voltage of amplifier 203 causes an increase or decrease in the amount of time that the switching signal is at the higher, conducting voltage and consequently, an increase or decrease the amount of time that the switching transistor 321 is conducting or is open.

The output of timer 281 is also connected to an integrator formed with resistor 241 and capacitor 223. The integrated output of timer 285 is received at the non inverting input of amplifier 220 via resistor 218. Since switching transistor 321 controls the current supplied to the inductor 318 from the +5 VDC output of power source 140 according the output of timer 285, the voltage level of the output of 285 is indicative of the amount of current being supplied to inductor 318 from power source 140. Thus, the integrated voltage level of the output of timer 285 is a steady state voltage level indicative of the amount of current being supplied to the inductor 318 from the power source 140 per a given period of time.

The inverting input of amplifier 220 receives an integrated voltage level of timer 281 via resistor 232. The inverting input is also coupled to the output of the amplifier 220 through resistor 229 and capacitor 226 to form a feed back loop. Since amplifier 220 receives the integrated voltage levels of both the output of timer 285 and the output of timer 281, any difference between the integrated levels will change the voltage level of the output of 220. Since the output of 220 is connected to the Cvolt input of timer 281, the output voltage of amplifier 220 controls the duty cycle of timer 281, and consequently controls the ratio of time that the inductor 315 is receiving current from the +5 VDC output. Thus, any difference between the duty cycles of each switching signal (time conducting/time not conducting) will result in amplifier 220 adjusting its output to change the duty cycle of timer 281 to match the duty cycle of timer 285.

If amplifier 203 senses that the voltage level of Vout 333 is less than Vref, amplifier 203 will increase the duty cycle of timer 285 by raising the voltage level of the Cvolt input 371 of timer 285. This increases the duty cycle of the output switching signal of timer 285. Sensing that the integrated output of timer 285 has increased indicating that more current is being provided to inductor 318 from the DC power source 140, amplifier 220 raises the voltage level of the Cvolt input 379 of timer 281 to increase the duty cycle of the output of timer 281 until the integrated voltage level of the output of 281 equals the integrated voltage level of the output of timer 285.

In a similar manner, if amplifier 203 senses that voltage level of Vout 333 is greater than Vref, amplifier 203 will decrease the duty cycle of timer 285 by lowering the voltage level of the Cvolt input 371 of timer 285. Sensing that the integrated output of timer 285 has decreased, amplifier 220 lowers the voltage level of the Cvolt input 379 of timer 281 to decrease the duty cycle of the output of timer 281 until the integrated voltage level of the output of 281 equals the integrated voltage level of the output of timer 285.

This voltage mode control, master-slave configuration of the switching circuits advantageously provides a method for the equalization of the current average supplied to each inductor from a DC power source. Thus, current equalization can be obtained using capacitors, resistors and timers that have wide ranging manufacturing tolerances.

The frequency of the oscillations of the outputs of timers 281 and 285 are dependent upon the output of timer 249. Referring to FIG. 3, timer 249 provides an oscillating output 350 having a frequency and a duty cycle that are determined by the resistive values of resistors 245 and 247 and capacitor 243. The output of 249 clocks flip flop 255 to produce at its output, a series of pulses (357) with each pulse beginning at the rising edge of timer 249 output 350. An inverted output of timer 249 is provided to the clock input of flip-flop 265 to produce an alternating signal 355 at the Q output of flip-flop 265 and an inverted alternating signal 353 at the inverted Q output of flip-flop 265.

The Q output of timer 265, through nand gate 267, prevents the delayed inverted output of timer 249 from changing the state of the reset input 365 of timer 281 during every other delayed inverted period of timer output 249. The Q output of flip-flop 265, through nand gate 269, prevents the pulse from flip-flop 255 from changing the state of the trigger input 360 of timer 281 during every other pulse of flip-flop 255. The inverted Q output of timer 265, through nand gate 271, prevents the delayed inverted output of timer 249 from changing the state of the reset input 367 of timer 285 during every other delayed inverted period of timer output 249. The inverted Q output of timer 265, through nand gate 273, prevents the pulse from flip-flop 255 from changing the state of the trigger input 363 of timer 285 during every other pulse of flip-flop 255. Masking these signals with flip-flop 265 and the nand gates enables the timers 281 and 285 to provide switching signals with rising edges that are 180 degrees out of phase with each other. This advantageously provides a smoother DC voltage level at output 333 as well as lowering the rms ripple current in capacitors 306 and 327.

OTHER EMBODIMENTS

The voltage level of other locations in the multiphase regulator circuit may be used to provide a voltage level indicative of the amount of current supplied from a DC power source to an inductor. For example, the voltage levels of the location in each phase where the inductor is connected to the switching transistor may integrated and provided to amplifier 220 to control the duty cycle of timer 281.

The output of amplifier 203 may be connected to the Cvolt input of both timers 281 and 285, thereby eliminating amplifier 220. Alternatively, the gates of both inductors 309 and 321 may be coupled to the output of timer 285, thereby eliminating timer 281 and amplifier 220.

In another embodiment, the multiphase DC voltage regulator using voltage mode control may be implemented or embedded in a single silicon chip.

While particular embodiments of the present invention have been shown and described, it will be obvious to those skilled in the art that changes and modifications may be made without departing from this invention and it's broader aspects and, therefore, the appending claims are to encompass within their scope all such changes and modifications as all within the true spirit and scope of this invention.

What is claimed is:

1. A multiphase direct current (DC) regulator for regulating power from a DC power source, the multiphase DC regulator comprising:

a first inductor coupled to a regulator output;

a first switch coupled to the first inductor, the first switch coupled to receive current from the DC power source and to supply the current to the first inductor;

a second inductor coupled to the regulator output;

a second switch coupled to the second inductor, the second switch coupled to receive current from the DC power source and to supply the current to the second inductor, the second switch controlling the amount of current supplied from the DC power source to the second inductor;

a voltage mode control circuit receiving an indication voltage level indicative of the amount of current supplied from the DC power source to the second inductor, the voltage mode control circuit providing a first control signal dependent upon the indication voltage level;

a first switching circuit responsive to the first control signal, the first switching circuit providing a first switching signal to the first switch, the first switch controlling the amount of current from the DC power source supplied to the first inductor according to the first switching signal;

a second switching circuit providing a second switching signal to the second switch, the second switch controlling the amount of current from the DC power source supplied to the second inductor according to the second switching signal; and wherein the indication voltage level is proportional to the second switching signal.

2. The multiphase direct current regulator of claim 1, the voltage mode control circuit further comprising:

a first integrator, the first integrator receiving the indication voltage and providing an integrated voltage level indicative of the amount of current supplied to the second inductor, the first control signal dependent upon the integrated voltage level.

3. The multiphase direct current regulator of claim 2, the voltage mode control circuit further comprising:

a second integrator, the second integrator receiving a second indication voltage level indicative of an amount of current supplied from the DC power source to the first inductor, the second integrator providing a second integrated voltage level indicative of the amount of current supplied to the first inductor; and a differential amplifier having a first input for receiving a voltage proportional to the first integrated voltage level and having a second input for receiving a voltage level proportional to the second integrated voltage level, the differential amplifier having an output for providing the first control signal.

4. The multiphase direct current regulator of claim 3 wherein:

the first switching signal transitioning back and forth between a first voltage level and a second voltage level, the first switching signal remaining at the first voltage level for a first period of time and remaining at the second voltage level for a second period of time; and the ratio of the first period of time to the second period of time being dependent upon the first control signal.

5. The multiphase direct current regulator of claim 4, the voltage mode control circuit further including:

a comparator receiving at a first input a first voltage level proportional to the voltage level at the regulator output, the comparator receiving at a second input a second voltage level proportional to a reference voltage level, the comparator having an output for providing a second control signal; and wherein the second switching circuit is responsive to the second control signal.

6. The multiphase direct current regulator of claim 1, the voltage mode control circuit further including:

a comparator receiving at a first input a first voltage level proportional to the voltage level at the regulator output, the comparator receiving at a second input a second voltage level proportional to a reference voltage level, the comparator having an output for providing a second control signal; and wherein the second switching circuit is responsive to the second control signal.

7. The multiphase direct current regulator of claim 6 wherein:

the second switching signal transitioning back and forth between a first voltage level and a second voltage level, the second switching signal remaining at the first voltage level for a first period of time and remaining at the second voltage level for a second period of time; and the ratio of the first period of time to the second period of time being dependent upon the second control signal.

8. The multiphase direct current regulator of claim 1 wherein the regulator is a synchronous regulator.

9. The multiphase direct current regulator of claim 1 wherein the regulator is a non-synchronous regulator.

10. The multiphase direct current regulator of claim 1, the first switching circuit further including:

a timer for providing the first switching signal, the first switching signal transitioning back and forth between a first voltage level and a second voltage level, the first switching signal remaining at the first voltage level for a first period of time and remaining at the second voltage level for a second period of time; and the ratio of the first period of time to the second period of time being dependent upon the first control signal.

11. A multiphase direct current (DC) regulator for regulating power from a DC power source, the multiphase DC regulator comprising:

a first inductor coupled to a regulator output;

a first switch coupled to the first inductor, the first switch coupled to receive current from the DC power source and to supply the current to the first inductor;

a second inductor coupled to the regulator output;

a second switch coupled to the second inductor, the second switch coupled to receive current from the DC power source and to supply the current to the second inductor, the second switch controlling the amount of current supplied from the DC power source to the second inductor;

a voltage mode control circuit receiving an indication voltage level indicative of the amount of current supplied from the DC power source to the second inductor, the voltage mode control circuit providing a first control signal dependent upon the indication voltage level;

a first switching circuit responsive to the first control signal, the first switching circuit providing a first switching signal to the first switch, the first switch controlling the amount of current from the DC power source supplied to the first inductor according to the first switching signal;

wherein the first switching circuit further includes:

a timer for providing the first switching signal, the first switching signal transitioning back and forth between a first voltage level and a second voltage level, the first switching signal remaining at the first voltage level for a first period of time and remaining at the second voltage level for a second period of time; and wherein the ratio of the first period of time to the second period of time being dependent upon the first control signal;

wherein the signal for determining the ratio is dependent upon an integrated indication voltage level.

12. A multiphase direct current (DC) regulator for regulating power from a DC power source, the multiphase DC regulator comprising:

a first inductor coupled to a regulator output;

a first switch coupled to the first inductor, the first switch coupled to receive current from the DC power source and to supply the current to the first inductor;

a second inductor coupled to the regulator output;

a second switch coupled to the second inductor, the second switch coupled to receive current from the DC power source and to supply the current to the second inductor, the second switch controlling the amount of current supplied from the DC power source to the second inductor;

a voltage mode control circuit receiving an indication voltage level indicative of the amount of current supplied from the DC power source to the second inductor, the voltage mode control circuit providing a first control signal dependent upon the indication voltage level;

a first switching circuit responsive to the first control signal, the first switching circuit providing a first switching signal to the first switch, the first switch controlling the amount of current from the DC power source supplied to the first inductor according to the first switching signal;

wherein the second inductor has a first end coupled to the second switch; and wherein the second the indication voltage level is proportional to the voltage level at the first end of the inductor.

13. A computer system comprising:

a processor;

a direct current (DC) power source, the direct current power source providing current at a voltage level; and a multiphase regulator circuit including:

a regulator output for providing DC power to the processor;

a first inductor coupled to the regulator output;

a first switch coupled to the first inductor, the first switch coupled to receive current from the DC power source and to supply the current to the first inductor;

a second inductor coupled to the regulator output;

a second switch coupled to the second inductor, the second switch coupled to receive current from the DC power source and to supply the current to the second inductor, the second switch controlling the amount of current supplied from the DC power source to the second inductor;

a voltage mode control circuit receiving an indication voltage level indicative of the amount of current supplied from the DC power source to the second inductor; the voltage mode control circuit providing a first control signal dependent upon the indication voltage level;

a first switching circuit responsive to the first control signal, the first switching circuit providing a first switching signal to the first switch, the first switch controlling the amount of current from the DC power source supplied to the first inductor according to the first switching signal; and a second switching circuit providing a second switching signal to the second switch, the second switch controlling the amount of current from the DC power source supplied to the second inductor according to the second switching signal;

the indication voltage level is proportional to the second switching signal.

14. The computer system of claim 13, the voltage mode control circuit further comprising:

a first integrator, the first integrator receiving the indication voltage and providing an integrated voltage level indicative of the amount of current supplied to the second inductor.

15. The computer system of claim 14, the voltage mode control circuit further comprising:

a second integrator, the second integrator receiving a second indication voltage level indicative of an amount of current supplied from the DC power source to the first inductor, the second integrator providing a second integrated voltage level indicative of the amount of current supplied to the first inductor; and a differential amplifier having a first input for receiving a voltage proportional to the first integrated voltage level and having a second input for receiving a voltage level proportional to the second integrated voltage level, the differential amplifier having an output for providing the first control signal.

16. The computer system of claim 15 wherein:

the first switching signal transitioning back and forth between a first voltage level and a second voltage level, the first switching signal remaining at the first voltage level for a first period of time and remaining at the second voltage level for a second period of time; and the ratio of the first period of time to the second period of time being dependent upon the first control signal.

17. The computer system of claim 16 further comprising:

a digital to analog (D/A) converter receiving a digital signal from the processor indicating a desired voltage level, the (D/A) converter providing a reference voltage level proportional to the desired voltage level;

wherein the voltage mode control circuit further includes:

a comparator receiving at a first input a first voltage level proportional to the voltage level at the regulator output, the comparator receiving at a second input a second voltage level proportional to the reference voltage level, the comparator having an output for providing a second control signal; and wherein the second switching circuit is responsive to the second control signal.

18. The computer system of claim 17 wherein:

the second switching signal transitioning back and forth between a first voltage level and a second voltage level, the second switching signal remaining at the first voltage level for a first period of time and remaining at the second voltage level for a second period of time; and the ratio of the first period of time to the second period of time being dependent upon the second control signal.

19. The computer system of claim 13 wherein the multiphase regulator circuit is a synchronous regulator circuit.

20. The computer system of claim 13 wherein the multiphase regulator circuit is a non-synchronous regulator circuit.

21. The computer system of claim 13, the first switching circuit further including;

a timer for providing the first switching signal, the first switching signal transitioning back and forth between a first voltage level and a second voltage level, the first switching signal remaining at the first voltage level for a first period of time and remaining at the second voltage level for a second period of time; and the ratio of the first period of time to the second period of time being dependent upon the first control signal.

22. A computer system comprising:

a processor;

a direct current (DC) power source, the direct current power source providing current at a voltage level; and a multiphase regulator circuit including:

a regulator output for providing DC power to the processor;

a first inductor coupled to the regulator output;

a first switch coupled to the first inductor, the first switch coupled to receive current from the DC power source and to supply the current to the first inductor;

a second inductor coupled to the regulator output;

a second switch coupled to the second inductor, the second switch coupled to receive current from the DC power source and to supply the current to the second inductor, the second switch controlling the amount of current supplied from the DC power source to the second inductor;

a voltage mode control circuit receiving an indication voltage level indicative of the amount of current supplied from the DC power source to the second inductor; the voltage mode control circuit providing a first control signal dependent upon the indication voltage level; and a first switching circuit responsive to the first control signal, the first switching circuit providing a first switching signal to the first switch, the first switch controlling the amount of current from the DC power source supplied to the first inductor according to the first switching signal;

wherein the second inductor has a first end coupled to the second switch; and wherein the second indication voltage level is proportional to the voltage level at the first end of the inductor.

23. A multiphase direct current (DC) regulator for regulating power from a DC power source, the multiphase DC regulator comprising:

a first inductor coupled to a regulator output;

a first switch coupled to the first inductor, the first switch coupled to receive current from the DC power source and to supply the current to the first inductor;

a second inductor coupled to the regulator output;

a second switch coupled to the second inductor, the second switch coupled to receive current from the DC power source and to supply the current to the second inductor, the second switch controlling the amount of current supplied from the DC power source to the second inductor;

a comparator receiving at a first input a first voltage level proportional to the voltage level at the regulator output, the comparator receiving at a second input a second voltage level proportional to a reference voltage level, the comparator having an output for providing a control signal;

a first switching circuit responsive to the first control signal, the first switching circuit providing a first switching signal to the first switch, the first switch controlling the amount of current from the DC power source supplied to the first inductor according to the first switching signal; and a second switching circuit responsive to the control signal, the second switching circuit providing a second switching signal to the second switch, the second switch controlling the amount of current from the DC power source supplied to the second inductor according to the second switching signal.

24. A multiphase direct current (DC) regulator for regulating power from a DC power source, the multiphase DC regulator comprising:

a first inductor coupled to a regulator output;

a first switch coupled to the first inductor, the first switch coupled to receive current from the DC power source and to supply the current to the first inductor;

a second inductor coupled to the regulator output;

a second switch coupled to the second inductor, the second switch coupled to receive current from the DC power source and to supply the current to the second inductor, the second switch controlling the amount of current supplied from the DC power source to the second inductor;

a comparator receiving at a first input a first voltage level proportional to the voltage level at the regulator output, the comparator receiving at a second input a second voltage level proportional to a reference voltage level, the comparator having an output for providing a control signal; and a first switching circuit responsive to the first control signal, the first switching circuit providing a first switching signal to the first switch, the first switch controlling the amount of current from the DC power source supplied to the first inductor according to the first switching signal;

wherein the first switching circuit provides the first switching signal to the second switch, the second switch controlling the amount of current from the DC power source supplied to the second inductor according to the first switching signal.

25. The multiphase direct current regulator of claim 1 wherein:

the voltage mode control circuit receives a voltage level proportional to the voltage level at the regulator output and receives a voltage level proportional to a reference voltage level, the voltage mode control circuit providing a second control signal dependent upon a difference between the voltage level proportional to the voltage level at the regulator output and the voltage level proportional to the reference voltage level;

the second switching circuit is responsive to the second control signal in providing the second switching signal to the second switch.

26. The multiphase direct current regulator of claim 25 wherein:

the second switching signal transitioning back and forth between a first voltage level and a second voltage level, the second switching signal remaining at the first voltage level for a first period of time and remaining at the second voltage level for a second period of time; and the ratio of the first period of time to the second period of time being dependent upon the second control signal.

27. The multiphase direct current regulator of claim 12, the voltage mode control circuit further comprising:

a first integrator, the first integrator receiving the indication voltage and providing an integrated voltage level indicative of the amount of current supplied to the second inductor, the first control signal dependent upon the integrated voltage level.

28. The multiphase direct current regulator of claim 27, the voltage mode control circuit further comprising:

a second integrator, the second integrator receiving a second indication voltage level indicative of an amount of current supplied from the DC power source to the first inductor, the second integrator providing a second integrated voltage level indicative of the amount of current supplied to the first inductor; and a differential amplifier having a first input for receiving a voltage proportional to the first integrated voltage level and having a second input for receiving a voltage level proportional to the second integrated voltage level, the differential amplifier having an output for providing the first control signal.

29. The multiphase direct current regulator of claim 28 wherein:

the first switching signal transitioning back and forth between a first voltage level and a second voltage level, the first switching signal remaining at the first voltage level for a first period of time and remaining at the second voltage level for a second period of time; and the ratio of the first period of time to the second period of time being dependent upon the first control signal.

30. The multiphase direct current regulator of claim 29, the voltage mode control circuit further including:

a comparator receiving at a first input a first voltage level proportional to the voltage level at the regulator output, the comparator receiving at a second input a second voltage level proportional to a reference voltage level, the comparator having an output for providing a second control signal; and a second switching circuit responsive to the second control signal, the second switching circuit providing a second switching signal to the second switch, the second switch controlling the amount of current from the DC power source supplied to the second inductor according to the second switching signal.

31. The multiphase direct current regulator of claim 12, the voltage mode control circuit further including:

a comparator receiving at a first input a first voltage level proportional to the voltage level at the regulator output, the comparator receiving at a second input a second voltage level proportional to a reference voltage level, the comparator having an output for providing a second control signal; and a second switching circuit responsive to the second control signal, the second switching circuit providing a second switching signal to the second switch, the second switch controlling the amount of current from the DC power source supplied to the second inductor according to the second switching signal.

32. The multiphase direct current regulator of claim 31 wherein:

the second switching signal transitioning back and forth between a first voltage level and a second voltage level, the second switching signal remaining at the first voltage level for a first period of time and remaining at the second voltage level for a second period of time; and the ratio of the first period of time to the second period of time being dependent upon the second control signal.

33. The multiphase direct current regulator of claim 12 wherein the regulator is a synchronous regulator.

34. The multiphase direct current regulator of claim 12 wherein the regulator is a non-synchronous regulator.

35. The multiphase direct current regulator of claim 12, the first switching circuit further including:

a timer for providing the first switching signal, the first switching signal transitioning back and forth between a first voltage level and a second voltage level, the first switching signal remaining at the first voltage level for a first period of time and remaining at the second voltage level for a second period of time; and the ratio of the first period of time to the second period of time being dependent upon the first control signal.

36. The multiphase direct current regulator of claim 12 further comprising:

a second switching circuit, the second switching circuit providing a second switching signal to the second switch, the second switch controlling the amount of current from the DC power source supplied to the second inductor according to the second switching signal;

wherein the voltage mode control circuit receives a voltage level proportional to the voltage level at the regulator output and receives a voltage level proportional to a reference voltage level, the voltage mode control circuit providing a second control signal dependent upon a difference between the voltage level proportional to the voltage level at the regulator output and the voltage level proportional to the reference voltage level;

wherein the second switching circuit is responsive to the second control signal in providing the second switching signal to the second switch.

37. The multiphase direct current regulator of claim 36 wherein:

the second switching signal transitioning back and forth between a first voltage level and a second voltage level, the second switching signal remaining at the first voltage level for a first period of time and remaining at the second voltage level for a second period of time; and the ratio of the first period of time to the second period of time being dependent upon the second control signal.

38. The computer system of claim 13 wherein the multiphase regulator circuit wherein:

the voltage mode control circuit receives a voltage level proportional to the voltage level at the regulator output and receives a voltage level proportional to a reference voltage level, the voltage mode control circuit providing a second control signal dependent upon a difference between the voltage level proportional to the voltage level at the regulator output and the voltage level proportional to the reference voltage level;

the second switching circuit is responsive to the second control signal in providing a second switching signal to the second switch.

39. The computer system of claim 38 wherein:

the second switching signal transitioning back and forth between a first voltage level and a second voltage level, the second switching signal remaining at the first voltage level for a first period of time and remaining at the second voltage level for a second period of time; and the ratio of the first period of time to the second period of time being dependent upon the second control signal.

40. The computer system of claim 22, the voltage mode control circuit further comprising:

a first integrator, the first integrator receiving the indication voltage and providing an integrated voltage level indicative of the amount of current supplied to the second inductor.

41. The computer system of claim 40, the voltage mode control circuit further comprising:

a second integrator, the second integrator receiving a second indication voltage level indicative of an amount of current supplied from the DC power source to the first inductor, the second integrator providing a second integrated voltage level indicative of the amount of current supplied to the first inductor; and a differential amplifier having a first input for receiving a voltage proportional to the first integrated voltage level and having a second input for receiving a voltage level proportional to the second integrated voltage level, the differential amplifier having an output for providing the first control signal.

42. The computer system of claim 41 wherein:

the first switching signal transitioning back and forth between a first voltage level and a second voltage level, the first switching signal remaining at the first voltage level for a first period of time and remaining at the second voltage level for a second period of time; and the ratio of the first period of time to the second period of time being dependent upon the first control signal.

43. The computer system of claim 42 further comprising:

a digital to analog (D/A) converter receiving a digital signal from the processor indicating a desired voltage level, the (D/A) converter providing a reference voltage level proportional to the desired voltage level;

wherein the voltage mode control circuit further includes:

a comparator receiving at a first input a first voltage level proportional to the voltage level at the regulator output, the comparator receiving at a second input a second voltage level proportional to the reference voltage level, the comparator having an output for providing a second control signal; and a second switching circuit responsive to the second control signal, the second switching circuit providing a second switching signal to the second switch, the second switch controlling the amount of current from the DC power source supplied to the second inductor according to the second switching signal.

44. The computer system of claim 43 wherein:

the second switching signal transitioning back and forth between a first voltage level and a second voltage level, the second switching signal remaining at the first voltage level for a first period of time and remaining at the second voltage level for a second period of time; and the ratio of the first period of time to the second period of time being dependent upon the second control signal.

45. The computer system of claim 22 wherein the multiphase regulator circuit is a synchronous regulator circuit.

46. The computer system of claim 22 wherein the multiphase regulator circuit is a non-synchronous regulator circuit.

47. The computer system of claim 22, the first switching circuit further including;

a timer for providing the first switching signal, the first switching signal transitioning back and forth between a first voltage level and a second voltage level, the first switching signal remaining at the first voltage level for a first period of time and remaining at the second voltage level for a second period of time; and the ratio of the first period of time to the second period of time being dependent upon the first control signal.

48. The computer system of claim 22 wherein the multiphase regulator circuit further includes:

a second switching circuit, the second switching circuit providing a second switching signal to the second switch, the second switch controlling the amount of current from the DC power source supplied to the second inductor according to the second switching signal;

wherein the voltage mode control circuit receives a voltage level proportional to the voltage level at the regulator output and receives a voltage level proportional to a reference voltage level, the voltage mode control circuit providing a second control signal dependent upon a difference between the voltage level proportional to the voltage level at the regulator output and the voltage level proportional to the reference voltage level;

wherein the second switching circuit is responsive to the second control signal in providing the second switching signal to the second switch.

49. The computer system of claim 48 wherein:

the second switching signal transitioning back and forth between a first voltage level and a second voltage level, the second switching signal remaining at the first voltage level for a first period of time and remaining at the second voltage level for a second period of time; and the ratio of the first period of time to the second period of time being dependent upon the second control signal.

50. A multiphase direct current (DC) regulator for regulating power from a DC power source, the multiphase DC regulator comprising:

a first phase including:
a first inductor coupled to a regulator output;
a first switch coupled to the first inductor, the first switch coupled to receive current from the DC power source and to supply the current to the first inductor, the first switch controlling the amount of current supplied from the DC power source to the first phase as per a first switching signal;

a second phase including:
a second inductor coupled to the regulator output;
a second switch coupled to the second inductor, the second switch coupled to receive current from the DC power source and to supply the current to the second inductor, the second switch controlling the amount of current supplied from the DC power source to the second phase as per a second switching signal;

a first switching circuit providing the first switching signal;

a second switching circuit providing the second switching signal;

a voltage mode control circuit receiving a first indication voltage level indicative of the amount of current supplied from the DC power source to the first phase and receiving a second indication voltage level indicative of the amount of current supplied from the DC power source to the second phase, the voltage mode control circuit providing a first control signal, the first control signal being dependent upon a difference in current amount to the first phase and to the second phase from the DC power source as indicated by the first indication voltage level and the second indication voltage level, wherein the first switching circuit is responsive to the first control signal in providing the first switching signal.

51. The multiphase direct current regulator of claim 50, the voltage mode control circuit further comprising:

a first integrator, the first integrator receiving the first indication voltage level and providing a first integrated voltage level indicative of the amount of current supplied to the first phase from the DC power source;

a second integrator, the second integrator receiving the second indication voltage, the second integrator providing a second integrated voltage level indicative of the amount of current supplied to the second phase from the DC power source; and a differential amplifier having a first input for receiving a voltage proportional to the first integrated voltage level and having a second input for receiving a voltage level proportional to the second integrated voltage level, the differential amplifier having an output for providing the first control signal.

52. The multiphase direct current regulator of claim 50 wherein:

the first indication voltage level is proportional to the first switching signal; and the second indication voltage level is proportional to the second switching signal.

53. The multiphase direct current regulator of claim 50 wherein:

the first inductor has a first end coupled to the first switch, the first the indication voltage level is proportional to the voltage level at the first end of the first inductor; and the second inductor has a first end coupled to the second switch, the second indication voltage level is proportional to the voltage level at the first end of the second inductor.

54. The multiphase direct current regulator of claim 50 wherein:

the voltage mode control circuit receives a voltage level proportional to the voltage level at the regulator output and receives a voltage level proportional to a reference voltage level, the voltage mode control circuit providing a second control signal dependent upon a difference between the voltage level proportional to the voltage level at the regulator output and the voltage level proportional to the reference voltage level;

wherein the second switching circuit is responsive to the second control signal in providing the second switching signal to the second switch.

55. The multiphase direct current regulator of claim 54 wherein:

the first switching signal has a duty cycle, the duty cycle being dependent upon the first control signal;

the second switching signal has a duty cycle, the duty cycle of the second switching signal being dependent upon the second control signal.

56. The multiphase direct current regulator of claim 50 wherein:

the first switching signal has a duty cycle, the duty cycle being dependent upon the first control signal.

57. The multiphase direct current regulator of claim 50 wherein:

the first switching circuit includes a first timer, the first timer having an output for providing the first switching signal;

the second switching circuit including a second timer, the second timer having an output for providing the second switching signal.

58. A computer system including the multiphase direct current regulator of claim 50 and the DC power source, the computer system further including a system processor receiving power from the regulator output.

59. A method for operating a multiphase direct current regulator comprising:

providing current from a power source to a first phase of the multiphase regulator including a first inductor via a first switch;

providing a first switching signal to the first switch to control the amount of current provided to the first phase via the first switch;

providing current from the power source to a second phase of the multiphase regulator including a second inductor via a second switch;

providing a second switching signal to the second switch to control the amount of current provided to the second phase via the second switch;

adjusting the first switching signal according to a difference in current amounts between the amount of current provided to the first phase as indicated by a first voltage level and the amount of current provided to the second phase as indicated by a second voltage level.

60. The method of claim 59 further wherein:

the first voltage level is proportional to the first switching signal;

the second voltage level is proportional to the second switching signal.

61. The method of claim 59 wherein the adjusting the first switching signal includes:

integrating the first voltage level;

integrating the second voltage level;

comparing the integrated first voltage level with the integrated second voltage level; and adjusting the first switching signal according to the comparison.

62. The method of claim 59 wherein:

the first switching signal is provided at a first duty cycle; and adjusting the first switching signal includes adjusting the duty cycle.

63. The method of claim 59 further comprising:

comparing a voltage reference level with a voltage level proportional to a voltage level of an output of the multiphase regulator; and adjusting the second switching signal according to the comparison.

* * * * *